United States Patent
Cook

(10) Patent No.: US 7,099,825 B1
(45) Date of Patent: Aug. 29, 2006

(54) USER MOBILITY IN A VOICE RECOGNITION ENVIRONMENT

(75) Inventor: Fred S. Cook, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 935 days.

(21) Appl. No.: 10/099,729

(22) Filed: Mar. 15, 2002

(51) Int. Cl.
*G10L 15/04* (2006.01)

(52) U.S. Cl. .................. 704/251; 704/231; 704/246; 704/270; 379/88.02; 379/88.13; 379/202.01; 455/563

(58) Field of Classification Search ............... 704/231, 704/270, 275, 251, 246; 379/88.02, 202.01, 379/88.13; 455/563
See application file for complete search history.

(56) References Cited

U.S. PATENT DOCUMENTS

| | | | |
|---|---|---|---|
| 4,520,576 A * | 6/1985 | Vander Molen ............. 34/534 |
| 5,054,082 A | 10/1991 | Smith et al. |
| 5,086,385 A | 2/1992 | Launey et al. |
| 5,371,901 A | 12/1994 | Reed et al. |
| 5,600,781 A * | 2/1997 | Root et al. .................. 715/745 |
| 5,623,539 A * | 4/1997 | Bassenyemukasa et al. .................. 379/88.02 |
| 5,666,400 A | 9/1997 | McAllister et al. |
| 5,671,328 A | 9/1997 | Fitzpatrick et al. |
| 5,956,683 A | 9/1999 | Jacobs et al. |
| 6,163,535 A | 12/2000 | Jordan et al. |
| 6,195,568 B1 * | 2/2001 | Irvin .......................... 455/563 |
| 6,327,346 B1 * | 12/2001 | Infosino .................. 379/88.02 |
| 6,839,410 B1 * | 1/2005 | Infosino .................. 379/88.02 |
| 6,853,716 B1 * | 2/2005 | Shaffer et al. ......... 379/202.01 |
| 2004/0076272 A1 * | 4/2004 | Zafar et al. ............. 379/88.13 |

* cited by examiner

Primary Examiner—Vijay B. Chawan

(57) ABSTRACT

A voice recognition system is disclosed. A device receives a signal indicating a user ID and transfers a signal indicating its device ID and the user ID to a processing system. The processing system obtains a device profile based on the device ID and obtains a user profile based on the user ID. The processing system generates voice recognition data customized for the device and the user based on the device profile and the user profile. The processing system transfers a signal indicating the voice recognition data to the device. The device indicates voice command readiness in response to the voice recognition data. The device receives a voice command from the user and translates the voice command based on the customized voice recognition data.

50 Claims, 5 Drawing Sheets

USER MOBILITY IN A VOICE RECOGNITION ENVIRONMENT

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The invention is related to the field of voice recognition, and in particular, to a system that provides customized voice recognition data to various types of voice recognition devices.

2. Description of the Prior Art

A device capable of voice recognition receives an audible voice command from a user and translates the voice command into an electronic or optical signal indicating the command. There are two primary types of voice recognition—speaker dependent and speaker independent. With speaker dependent voice recognition, the device recognizes voice commands by using a user profile that is specific to the user. With speaker independent voice recognition, the device recognizes voice commands with a generic profile that is the same for all users. Speaker dependent voice recognition devices generally operate better than speaker independent devices.

For speaker dependent voice recognition, the user creates their user profile in a time-consuming process referred to as "training". The user trains a device by recording several voice commands prior to normal device operation to generate a user profile with the pre-recorded voice commands. During normal operation, the device then compares newly received voice commands to the pattern made from pre-recorded voice commands to translate the new voice command into an electric signal indicating the command. The device then implements the command. The device may also modify the pre-recorded commands based on successful command translations or based on the introduction of new commands.

Unfortunately, the above system requires the user to re-train each new voice recognition device. To address this problem, centralized voice recognition systems have been developed to house multiple user profiles. When a device receives a voice command from a user, the device transfers an electronic version of the voice command to the central system along with a user identifier (ID). The central system uses the user ID to retrieve the user profile and uses the user profile to translate the voice command. The central system then transfers the translated command to the appropriate device for implementation. Advantageously, the user may use voice commands to control multiple devices without re-training each device. Unfortunately, centralized command translation requires every device to transfer each voice command over a quality communication link to the central system for voice translation.

To address this problem, a central system that stores multiple user profiles may be adapted to download a user's profile to the given device that the user desires to operate. When a user starts to operate the device, the device transfers the user ID to the central system. The central system uses the user ID to retrieve the appropriate user profile and transfer that user profile to the device. The device then uses the selected user profile for voice command translation. Advantageously, the user may operate various devices using their own profile without re-training and without centralized command translation.

Unfortunately, this adapted central system treats all devices the same. Different types of devices may have different voice recognition capabilities and commands. Different devices may also use different protocols for communicating with the central system. For example, a voice-activated telephone will have different capabilities, commands, and protocols than a voice-activated toy or a voice-activated word processor—although some capabilities, commands, and protocols may be the same. A voice recognition system is needed that can provide voice recognition data that is customized for both the user and the device.

SUMMARY OF THE INVENTION

The invention helps solve the above problems with a voice recognition system that provides voice recognition data that is customized for both the user and the device. Advantageously, new devices with different voice recognition capabilities and formats may still share trained commands and data, but receive it their own customized format. Thus, the user need not retrain the same commands on each different type of device.

Some examples of the invention include a voice recognition system or method of operation where the voice recognition system includes a first device, a processing system, and possibly a second device. The first device receives a first signal indicating a first user ID for a first user. The first device transfers a second signal indicating a first device ID for the first device and indicating the first user ID to the processing system. The processing system obtains a first device voice recognition profile based on the first device ID and obtains a first-user voice recognition profile based on the first user ID. The processing system generates a first set of voice recognition data customized for the first device and the first user based on the first device voice recognition profile and the first user voice recognition profile. The processing system transfers a third signal indicating the first set of the voice recognition data to the first device. The first device indicates voice command readiness in response to the first set of the voice recognition data. The first device receives a first voice command from the first user. The first device translates the first voice command based on the first set of the voice recognition data.

In some examples of the invention, the second device receives a fourth signal indicating the first user ID. The second device transfers a fifth signal indicating a second device ID for the second device and indicating the first user ID to the processing system. The processing system obtains a second device voice recognition profile based on the second device ID and obtains the first user voice recognition profile based on the first user ID. The second device voice recognition profile is different from the first device voice recognition profile to reflect different voice recognition capabilities between the first device and the second device. The processing system generates a second set of the voice recognition data customized for the second device and the first user based on the second device voice recognition profile and the first user voice recognition profile. The processing system transfers a sixth signal indicating the second set of the voice recognition data from the processing system to the second device. The second device indicates voice command readiness in response to the second set of the voice recognition data. The second device receives a second voice command from the first user and translates the second voice command based on the second set of the voice recognition data.

In some examples of the invention, the first device receives a fourth signal indicating a second user ID for a second user. The first device transfers a fifth signal indicating the first device ID and indicating the second user ID to a processing system. The processing system obtains the first device voice recognition profile based on the first device ID and obtains a second user voice recognition profile based on the second user ID. The second user voice recognition profile is different from the first user voice recognition profile to reflect different voice recognition characteristics between the first user and the second user. The processing system generates a second set of the voice recognition data customized for the first device and the second user based on the first device voice recognition profile and the second user voice recognition profile. The processing system transfers a sixth signal indicating the second set of the voice recognition data to the first device. The first device indicates voice command readiness in response to the second set of the voice recognition data. The first device receives a second voice command from the second user and translates the second voice command based on the second set of the voice recognition data.

In some examples of the invention, the second device receives a fourth signal indicating a second user ID for a second user. The second device transfers a fifth signal indicating a second device ID for the second device and indicating the second user ID to the processing system. The processing system obtains a second device voice recognition profile based on the second device ID and obtains a second user voice recognition profile based on the second user ID. The processing system generates a second set of the voice recognition data customized for the second device and the second user based on the second device voice recognition profile and the second user voice recognition profile. The processing system transfers a sixth signal indicating the second set of the voice recognition data from the processing system to the second device. The second device indicates voice command readiness in response to the second set of the voice recognition data. The second device receives a second voice command from the second user into the second device and translates the second voice command based on the second set of the voice recognition data.

In some examples of the invention, the first device transfers a fourth signal indicating new voice recognition data for the first user to the processing system, and the processing system modifies the first user voice recognition profile based on the new voice recognition data for the first user. In some examples of the invention, the first device transfers a fourth signal indicating new voice recognition data for the first device to the processing system, and the processing system modifies the first device voice recognition profile based on the new voice recognition data for the first device.

In some examples of the invention, the second signal may indicate the first user voice recognition profile. The second signal may indicate the first device voice recognition profile. The generation of the first set of the voice recognition data that is customized for the first device and the first user based on the first device voice recognition profile and the first user voice recognition profile may comprise translating a command recognition library for the first user into a format suitable for the first device. The translation of the first voice command based on the first set of the voice recognition data may comprise converting audible user speech into an electronic signal indicating the first voice command.

Some examples of the invention include a processing system or method of operation where the processing system includes a communication interface and control system. The communication interface receives a first signal from a first device indicating a first user ID for a first user and a first device ID for the first device. The control system obtains a first device voice recognition profile based on the first device ID and obtains a first user voice recognition profile based on the first user ID. The control system generates a first set of voice recognition data customized for the first device and the first user based on the first device voice recognition profile and the first user voice recognition profile. The communication interface transfers a second signal to the first device indicating the first set of the voice recognition data.

In some examples of the invention, the communication interface receives a third signal from a second device indicating the first user ID and a second device ID for the second device. The control system obtains a second device voice recognition profile based on the second device ID. The control system generates a second set of the voice recognition data customized for the second device and the first user based on the second device voice recognition profile and the first user voice recognition profile. The communication interface transfers a fourth signal to the second device indicating the second set of the voice recognition data.

In some examples of the invention, the communication interface receives a third signal from the first device indicating a second user ID for a second user and the first device ID. The control system obtains the first device voice recognition profile based on the first device ID and obtains a second user voice recognition profile based on the second user ID. The control system generates a second set of the voice recognition data customized for the first device and the second user based on the first device voice recognition profile and the second user voice recognition profile. The communication interface transfers a fourth signal to the first device indicating the second set of the voice recognition data.

In some examples of the invention, the communication interface receives a third signal from a second device indicating a second user ID for a second user and a second device ID for the second device. The control system obtains a second device voice recognition profile based on the second device ID and obtains a second user voice recognition profile based on the second user ID. The control system generates a second set of the voice recognition data customized for the second device and the second user based on the second device voice recognition profile and the second user voice recognition profile. The communication interface transfers a fourth signal to the second device indicating the second set of the voice recognition data.

In some examples of the invention, the communication interface receives a third signal indicating new voice recognition data for the first user from the first device and the control system modifies the first user voice recognition profile based on the new voice recognition data for the first user. In some examples of the invention, the communication interface receives a third signal indicating new voice recognition data for the first device from the first device and the control system modifies the first device voice recognition profile based on the new voice recognition data for the first device.

Some examples of the invention include a software product comprising storage media that stores software that directs a control system to: 1) receive a first user ID for a first user and a first device ID for a first device from a communication interface, 2) obtain a first device voice recognition profile based on the first device ID, 3) obtain a first user voice recognition profile based on the first user ID, 4) generate a first set of voice recognition data customized for the first device and the first user based on the first device voice recognition profile and the first user voice recognition profile, and 5) transfer the first set of the voice recognition data to the communication interface for transfer to the first device.

In some examples of the invention, the software also directs the control system to: 6) receive the first user ID and a second device ID for a second device from the communication interface, 7) obtain a second device voice recognition profile based on the second device ID, 8) obtain a first user voice recognition profile based on the first user ID, 9) generate a second set of the voice recognition data customized for the second device and the first user based on the second device voice recognition profile and the first user voice recognition profile, and 10) transfer the second set of the voice recognition data to the communication interface for transfer to the second device.

In some examples of the invention, the software also directs the control system to: 6) receive a second user ID for a second user and the first device ID from the communication interface, 7) obtain the first device voice recognition profile based on the first device ID, 8) obtain a second user voice recognition profile based on the second user ID, 9) generate a second set of the voice recognition data customized for the first device and the second user based on the first device voice recognition profile and the second user voice recognition profile, and 10) transfer the second set of the voice recognition data to the communication interface for transfer to the first device.

In some examples of the invention, the software also directs the control system to: 6) receive a second user ID for a second user and a second device ID for a second device from the communication interface, 7) obtain a second device voice recognition profile based on the second device ID, 8) obtain a second user voice recognition profile based on the second user ID, 9) generate a second set of the voice recognition data customized for the second device and the second user based on the second device voice recognition profile and the second user voice recognition profile, and 10) transfer the second set of the voice recognition data to the communication interface for transfer to the second device.

In some examples of the invention, the software also directs the control system to receive new voice recognition data for the first user from the communication interface and modify the first user voice recognition profile based on the new voice recognition data for the first user. In some examples of the invention, the software also directs the control system to receive new voice recognition data for the first device from the communication interface and modify the first device voice recognition profile based on the new voice recognition data for the first device. In some examples of the invention, the software also directs the control system to receive the first user voice recognition profile from the communication interface. In some examples of the invention, the software also directs the control system to receive the first device voice recognition profile from the communication interface. In some examples of the invention, the software also directs the control system to translate a command recognition library for the first user into a format suitable for the first device.

BRIEF DESCRIPTION OF THE DRAWINGS

The same reference number represents the same element on all drawings.

DETAILED DESCRIPTION OF THE PREFERRED EMBODIMENT

Figure 1:
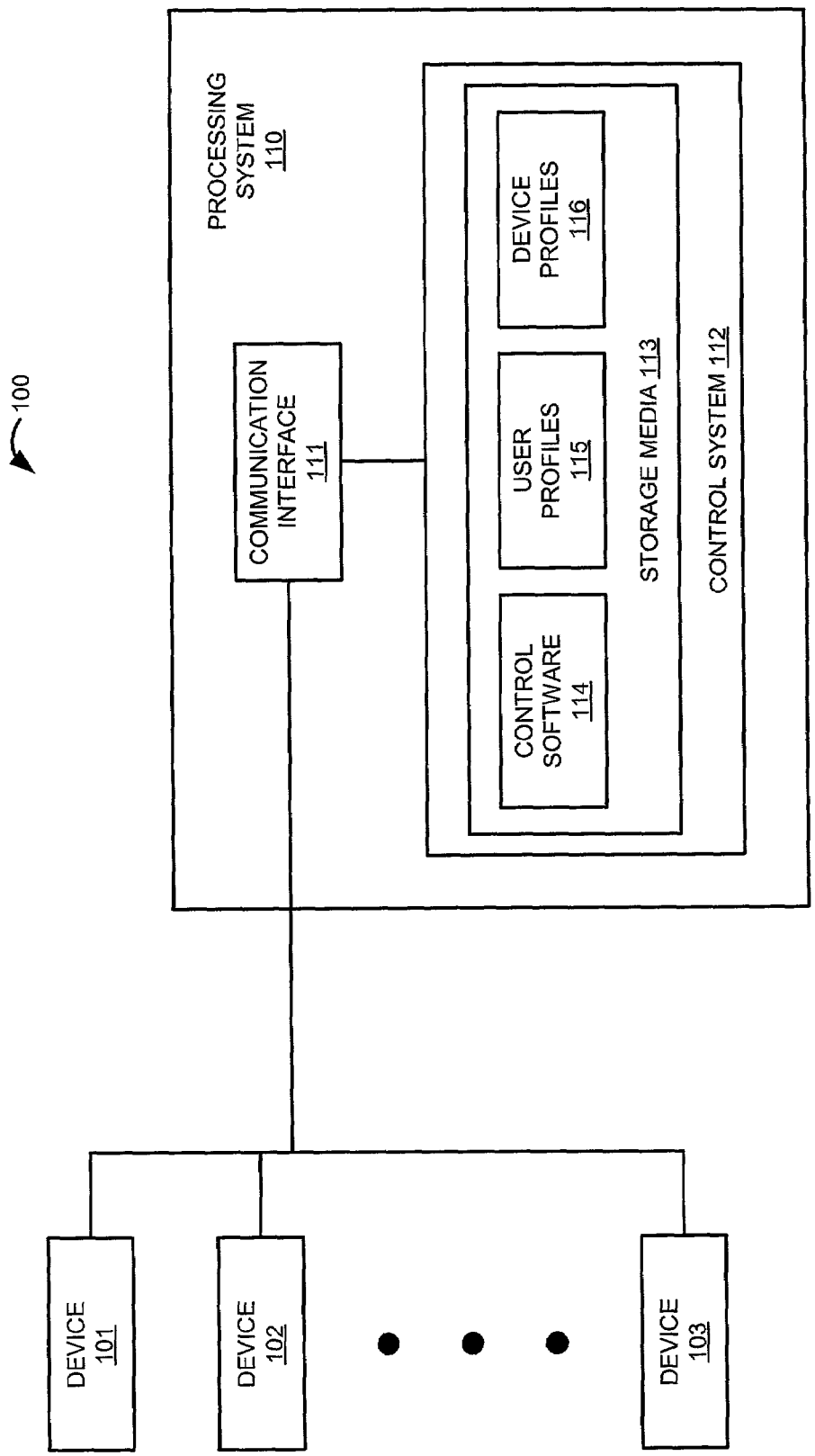
FIG. 1 illustrates a voice recognition system in an example of the invention.
Figure 2:
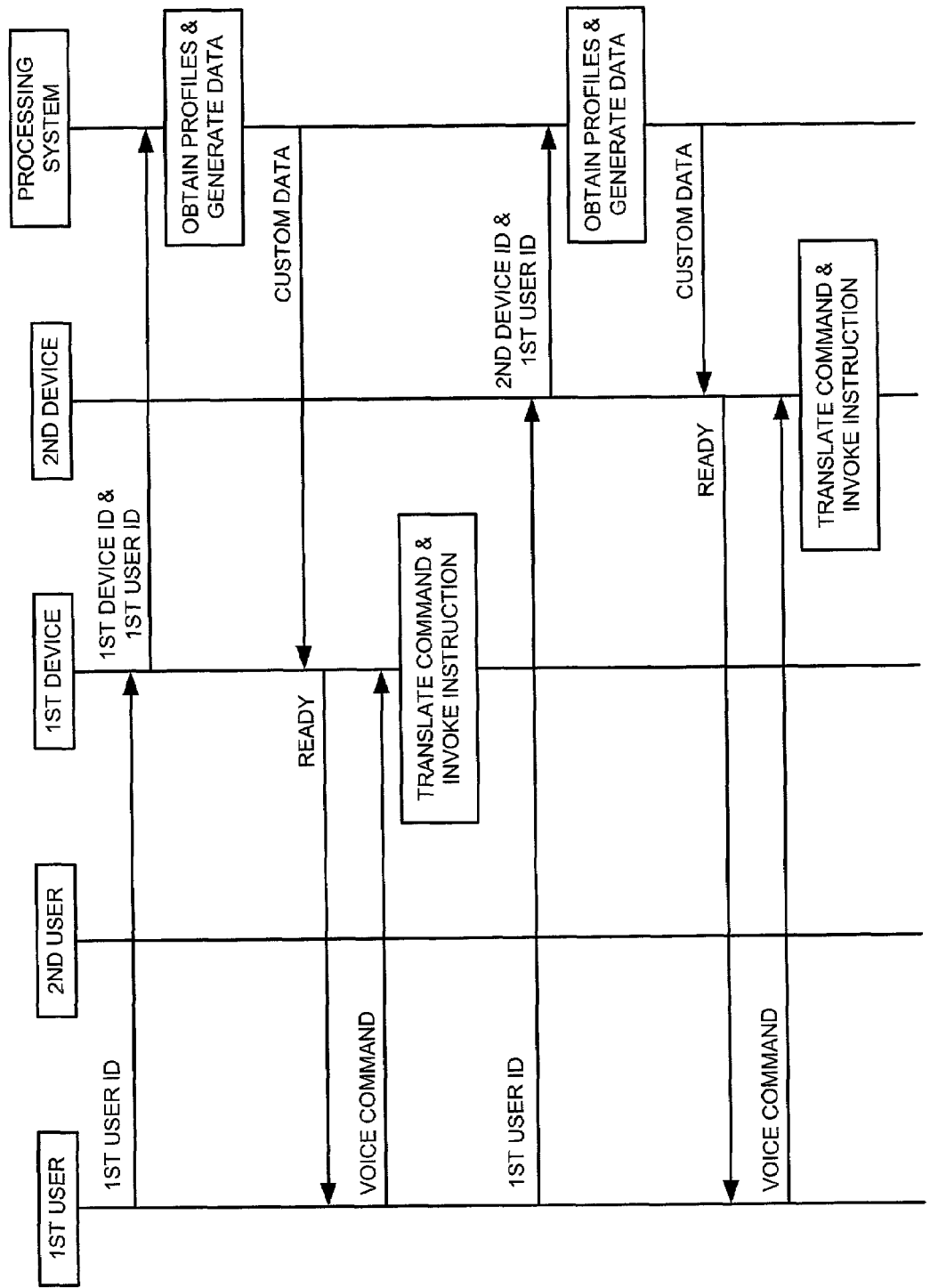
FIG. 2 illustrates voice recognition system operation in an example of the invention.

Voice Recognition System Configuration—FIG. 1

FIG. 1 illustrates voice recognition system 100 in an example of the invention. Voice recognition system 100 is comprised of devices 101–103 and processing system 110. There could be additional devices, but only three are shown for clarity. Processing system 110 is comprised of communication interface 111 and control system 112. Control system 112 includes storage media 113. Storage media 113 stores control software 114, user profiles 115, device profiles 116.

A single user or multiple users may operate devices 101–103 through spoken commands. A user typically has a user ID and a corresponding user voice recognition profile in user profiles 115. A user voice recognition profile indicates a user's personal information and trained commands. One example of a simplified voice recognition profile for a user follows below. The first table contains personal data, and the second table contains the commands and corresponding user voice patterns. Note that command #21 is an alternate command name, and numerous such entries may be included.

| USER DATA | |
|---|---|
| USER ID | JOHN DOE #1 |
| DATE OF BIRTH | 2/5/65 |
| NATIONALITY | CHINESE |
| LANGUAGE | MANDARIN #2 |

| COMMAND # | SPOKEN COMMAND | USER'S DIGITAL VOICE PATTERN FOR COMMAND |
|---|---|---|
| COMMAND #1 | ON | 1010111110 . . . |
| COMMAND #2 | OFF | 0001010101 . . . |
| COMMAND #3 | VIEW MENU | 1010100110 . . . |
| COMMAND #4 | MENU LEFT | 1010110100 . . . |
| COMMAND #5 | MENU RIGHT | 0010111000 . . . |
| COMMAND #6 | MENU UP | 0010110100 . . . |
| COMMAND #7 | MENU DOWN | 1010000100 . . . |
| COMMAND #8 | MENU SELECT | 1101000100 . . . |

-continued

| COMMAND # | SPOKEN COMMAND | USER'S DIGITAL VOICE PATTERN FOR COMMAND |
|---|---|---|
| COMMAND #9 | ONE | 0111000010 . . . |
| COMMAND #10 | TWO | 1101001101 . . . |
| COMMAND #11 | THREE | 0001100100 . . . |
| COMMAND #12 | FOUR | 1100101010 . . . |
| COMMAND #13 | FIVE | 0001011111 . . . |
| COMMAND #14 | SIX | 1101000110 . . . |
| COMMAND #15 | SEVEN | 1110100011 . . . |
| COMMAND #16 | EIGHT | 0010100010 . . . |
| COMMAND #17 | NINE | 1111100100 . . . |
| COMMAND #18 | TEN | 0101001010 . . . |
| COMMAND #19 | YES | 0001011100 . . . |
| COMMAND #20 | NO | 1111011101 . . . |
| COMMAND #21 | START | COMMAND #1 PATTERN |

Devices 101–103 could be computers, telephones, toys, appliances, video equipment, or other systems that perform voice recognition. Based on this disclosure, those skilled in the art will readily understand how to modify existing devices to operate in accord with the invention. Each device has device ID and a corresponding device voice recognition profile. A device voice recognition profile indicates device characteristics, commands, and corresponding instructions used by the device for voice recognition. A class of devices could be established that share the same voice recognition profile, so a single profile or portions of the profile would be stored and shared for multiple devices. One example of a simplified voice recognition profile for a device follows below. The first table contains device characteristic data, and the second table contains commands and corresponding instruction sequences that are invoked by the commands.

| DEVICE CHARACTERISTIC | CHARACTERISTIC DATA |
|---|---|
| DEVICE ID | ABC12345 |
| PROCESSOR TYPE | PENTIUM 3 |
| PROCESSOR SPEED | 833 MHZ |
| RAM | 500 MB |
| VOICE RECOGNITION ALGORITHM | ACME VERSION 2.5 |
| COMMUNICATION PROTOCOL | TCP/IP |
| MESSAGE FORMAT | ACME MESSENGER |
| NETWORK ADDRESS | 123.456.7890 |
| STORAGE FORMAT | ABC VERSION 3.5 |

| COMMAND # | SPOKEN COMMAND | COMMAND INSTRUCTION SEQUENCE |
|---|---|---|
| COMMAND #1 | ON | A |
| COMMAND #2 | OFF | B |
| COMMAND #3 | LOUDER | C |
| COMMAND #4 | QUIETER | D |
| COMMAND #5 | VIEW MENU | E |
| COMMAND #6 | MENU LEFT | F |
| COMMAND #7 | MENU RIGHT | G |
| COMMAND #8 | MENU UP | H |
| COMMAND #9 | MENU DOWN | I |
| COMMAND #10 | MENU SELECT | J |
| COMMAND #11 | CHANGE CHANNEL | K |
| COMMAND #12 | VIEW PROGRAM GUIDE | L |
| COMMAND #13 | PLAY | M |
| COMMAND #14 | REWIND | N |
| COMMAND #15 | FAST FORWARD | O |

-continued

| COMMAND # | SPOKEN COMMAND | COMMAND INSTRUCTION SEQUENCE |
|---|---|---|
| COMMAND #16 | GO TO FRONT | P |
| COMMAND #17 | PAUSE | Q |
| COMMAND #18 | RECORD | R |
| COMMAND #19 | STOP | S |
| COMMAND #20 | CHANNEL | T |

Device 101 receives audible voice commands from the user. Device 101 uses voice recognition data to translate the voice commands into signals indicating the commands. Device 101 implements the commands indicated by the signals. Advantageously, the voice recognition data is provided by processing system 110 and is customized for both the user and device 101.

Device 101 communicates with communication interface 111 to receive the customized voice recognition data. For example, device 101 may exchange messages with communication interface 111 over a Local Area Network (LAN), the Internet, a Bluetooth interface, or some other communication link. Device 101 transfers a user ID and its own device ID to the processing system to request the custom voice recognition data. Devices 102–103 would be similar.

Communication interface 111 exchanges messages with devices 101–103 for control system 112. Communication interface 111 could be an wireline LAN card, a wireless network card, Bluetooth interface, or some other communication equipment—typically with the appropriate protocol stacks and device drivers. Communication interface 111 exchanges message information with control system 112.

Control system 112 could be comprised of control circuitry and memory. Storage media 113 could be comprised of disks, tape, integrated circuits, servers, or some other type of memory device. Control system 112 retrieves control software 114 from storage media 113. Control system 112 executes control software 114 to operate in accord with the invention. Control system 112 also retrieves user profiles 115 and device profiles 116 from storage media 113.

Together, communication interface 111 and control system 112 could be comprised of standard computer systems—including processors, memory, and network interfaces—that are programmed in accord with the invention. Those skilled in the art will appreciate how other forms of circuitry, such as application specific integrated circuits and programmable gate arrays, could be used to make processing system 110 instead of using a programmed computer system. Control software 114 may include firmware in some examples of the invention.

Control system 112 receives a specific user ID and a specific device ID through communication interface 111. Control system 112 uses the user ID to retrieve the corresponding user profile from user profiles 115. Control system 112 uses the device ID to retrieve the corresponding device profile from device profiles 116. Control system 112 processes the retrieved user and device profiles to generate voice recognition data that is customized for both the user and the device. Control system 112 then transfers the customized voice recognition data through communication interface 111 to the device.

To generate the voice recognition data, control system 112 includes user voice patterns from the user profile that correspond to spoken commands in the device profile the commands that are known to the device. Control system 112 may also substitute by using a voice pattern from the user profile to invoke a related instruction sequence from the device profile. For example, control system may use the voice pattern for "go" as a substitute for the term "start". Advantageously, a device gets previously trained commands from a user profile if the user commands correspond to device commands or instruction sequences in the device profile. By selecting only the trained voice commands that the device knows, the device is not burdened with the entire command set in the user profile. As devices train new commands, the new commands are added to the user profile for subsequent use by other devices. Many commands, such as on/off, letters and numbers, and menu operations can be shared across multiple device without retraining each device. Thus, control system 112 translates the user's existing command recognition library into a format suitable for the device.

Command training can be accomplished in numerous ways. Many devices will prompt the user to speak a command and store the resulting users voice pattern in association with the proper instruction sequence. Alternatively, other device may be used to obtain user voice patterns for new commands and transfer the user voice patterns to processing system 110 for implementation. For example, users could place a telephone call to system that records and forwards voice prints for new commands. Processing system 110 may be equipped with a voice interface, such as over the public telephone network or the Internet, to obtain user voice patterns for new commands.

Control system 112 may perform data conversion and formatting on the user profile to generate voice recognition data that is consistent with the capabilities and protocols used by the device. Typically this would resolve differences in sampling rates, encoding methods, or command terminology. Different voice recognition algorithms may require different formatting, so control system 112 formats the data to be suitable for each device. The nationality, age, or language of the user may or may not be important to the device, so control system may include such information in the voice recognition data. The processor and memory capacity of the device may affect the scope and abstraction of the voice recognition data generated by control system 112. Different devices may use different encoding standards, so control system 112 uses the appropriate encoding standard for each device. Control system 112 assesses these and other such factors to generate the custom voice recognition data from the user profile and the device profile.

Voice Recognition System Operation—FIGS. 2–5

FIGS. 2–5 illustrate voice recognition system operation in an example of the invention. On FIG. 2, a first device receives a signal indicating a user ID for a first user. The first device transfers a signal to the processing system indicating a device ID for the first device and indicating the user ID for the first user. The processing system uses the device ID to obtain the device voice recognition profile for the first device and uses the user ID to obtain the user voice recognition profile for the first user.

The processing system generates a set of voice recognition data customized for the first device and the first user based on the device voice recognition profile for the first device and the user voice recognition profile for the first user. For example, the processing system determines if any user voice patterns in the user profile match with any spoken commands in the device profile. The processing system transfers a signal to the first device indicating its custom set of the voice recognition data, and when done loading, the first device indicates that it is ready to receive voice commands. The first device receives a voice command from the first user and translates the voice command based on this custom set of the voice recognition data. The first device then invokes the instruction sequence that corresponds to the translated command in the device profile.

A second device also receives a signal indicating the user ID for the first user. The second device transfers a signal to the processing system indicating a device ID for the second device and indicating the user ID for the first user. The processing system uses the device ID to obtain the device voice recognition profile for the second device and uses the user ID to obtain the user voice recognition profile for the first user. Note that the device voice recognition profile for the second device may be different from the device voice recognition profile for the first device to reflect different voice recognition capabilities between the first device and the second device.

The processing system generates a set of voice recognition data customized for the second device and the first user based on the device voice recognition profile for the second device and the user voice recognition profile for the first user. The processing system transfers a signal to the second device indicating its custom set of the voice recognition data, and when done loading, the second device indicates that it is ready to receive voice commands. The second device receives a voice command from the first user and translates the voice command based on this custom set of the voice recognition data. The second device then invokes the instruction sequence that corresponds to the translated command in the device profile.

Figure 3:
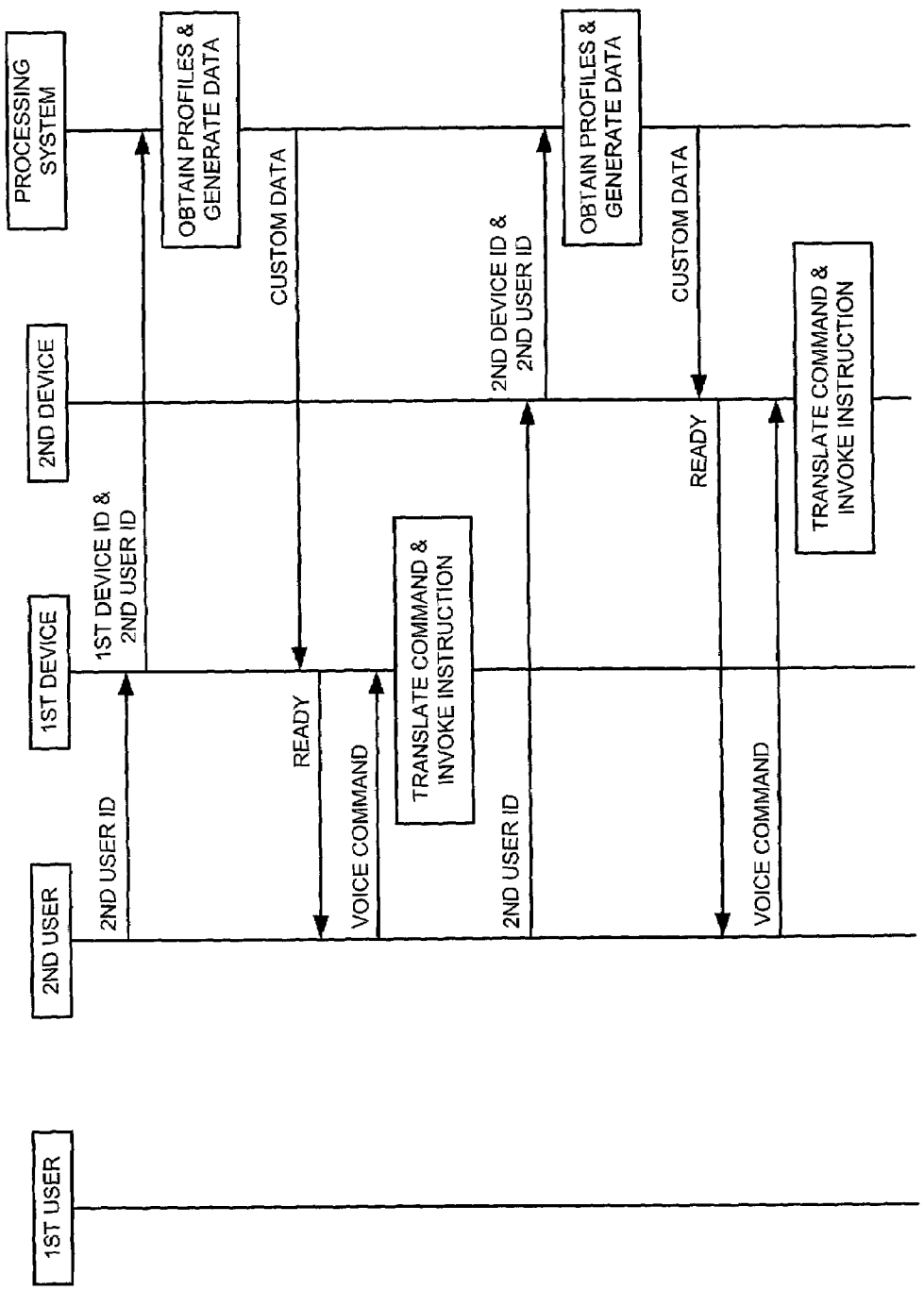
FIG. 3 illustrates voice recognition system operation in an example of the invention.

On FIG. 3, the first device receives a signal indicating a user ID for a second user. The first device transfers a signal to the processing system indicating a device ID for the first device and indicating the user ID for the second user. The processing system uses the device ID to obtain the device voice recognition profile for the first device and uses the user ID to obtain the user voice recognition profile for the second user. Note that user voice recognition profile for the second user is different from the user voice recognition profile for the first user to reflect different voice recognition characteristics between the first user and the second user.

The processing system generates a set of voice recognition data customized for the first device and the second user based on the device voice recognition profile for the first device and the user voice recognition profile for the second user. The processing system transfers a signal to the first device indicating its custom set of the voice recognition data, and when done loading, the first device indicates that it is ready to receive voice commands. The first device receives a voice command from the second user and translates the voice command based on this custom set of the voice recognition data. The first device then invokes the instruction sequence that corresponds to the translated command in the device profile.

The second device also receives a signal indicating the user ID for the second user. The second device transfers a signal to the processing system indicating a device ID for the second device and indicating the user ID for the second user. The processing system uses the device ID to obtain the device voice recognition profile for the second device and uses the user ID to obtain the user voice recognition profile for the second user.

The processing system generates a set of voice recognition data customized for the second device and the second user based on the device voice recognition profile for the second device and the user voice recognition profile for the second user. The processing system transfers a signal to the second device indicating its custom set of the voice recognition data, and when done loading, the second device indicates that it is ready to receive voice commands. The second device receives a voice command from the second user and translates the voice command based on this custom set of the voice recognition data. The second device then invokes the instruction sequence that corresponds to the translated command in the device profile.

Figure 4:
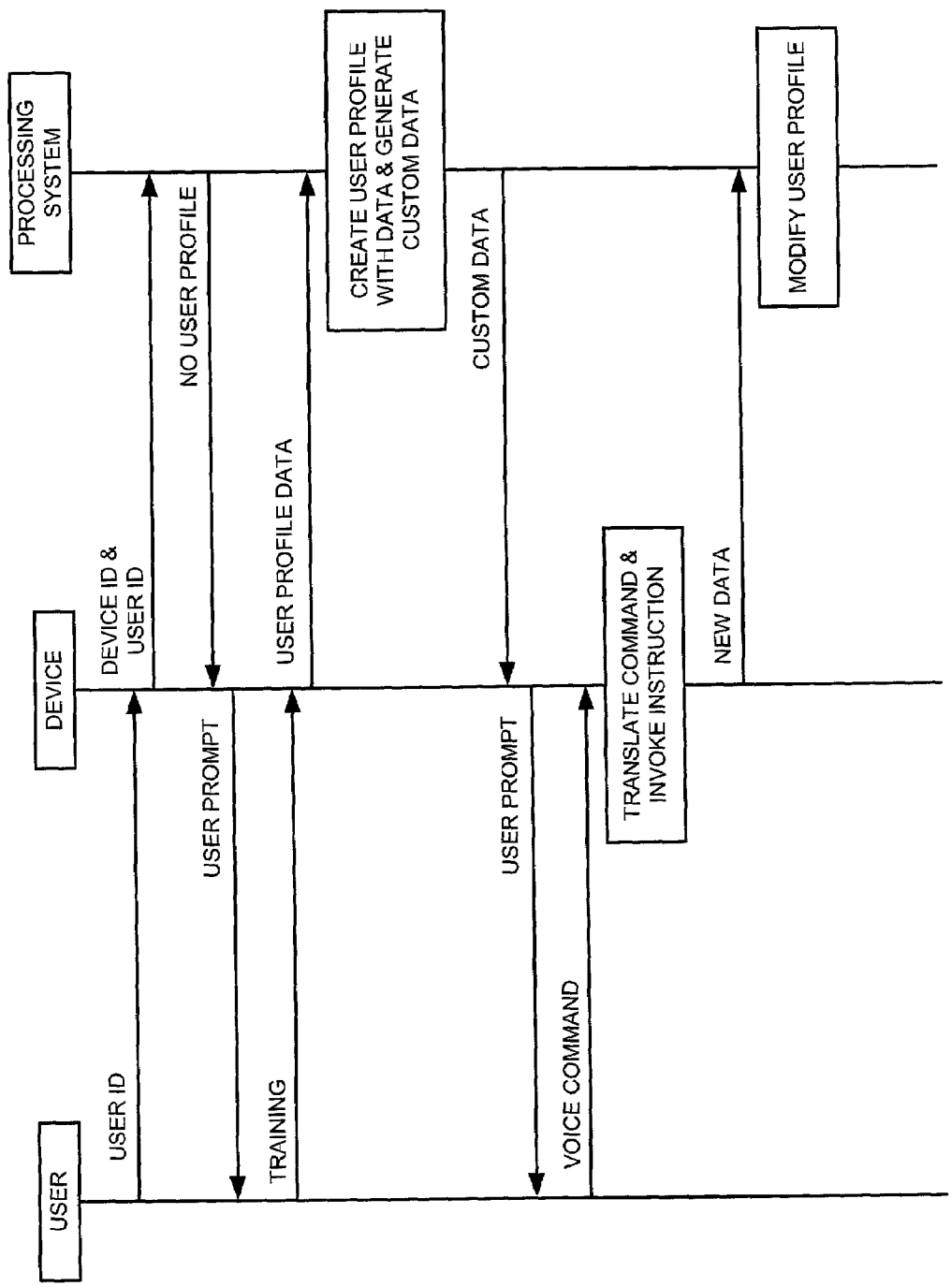
FIG. 4 illustrates voice recognition system operation in an example of the invention.

On FIG. 4, a device receives a signal indicating a user ID. The device transfers a signal to the processing system indicating its device ID and the user ID. The processing system determines that there is no user profile for the user ID and transfers a signal indicating this to the device. The processing system may also transfer an application to the device to assist in user profile creation. The device prompts the user to train the device and generate the user profile. To perform the training, the device prompts the user for spoken commands and records the resulting voice patterns in association with the proper instruction sequences. The device transfers a signal to the processing system indicating the user profile data. The processing system stores the new user profile and associated data and generates a set of voice recognition data customized for the device and the user based on the device voice recognition profile for the device and the user voice recognition profile for the user. The processing system transfers a signal to the device indicating its custom set of the voice recognition data. The device prompts the user to indicate that voice command capability is available. The device then receives a voice command from the user and translates the voice command based on this custom set of the voice recognition data. The device then invokes the instruction sequence that corresponds to the translated command in the device profile.

During subsequent operation, the device may acquire new voice recognition data, such as newly trained commands, data related to successful translations, or other changes to a user profile. The device transfers this new data to the processing system. The processing system modifies the user's profile based on the new data. This user profile update process could be designed to occur periodically.

Alternatively, the processing system and/or the device may use various means to perform the training. For example, the processing system may use a separate system, such as an automated telephonic voice response system, to prompt the user and collect the user profile. The device may prompt the user to use a separate system to collect the user profile.

Figure 5:
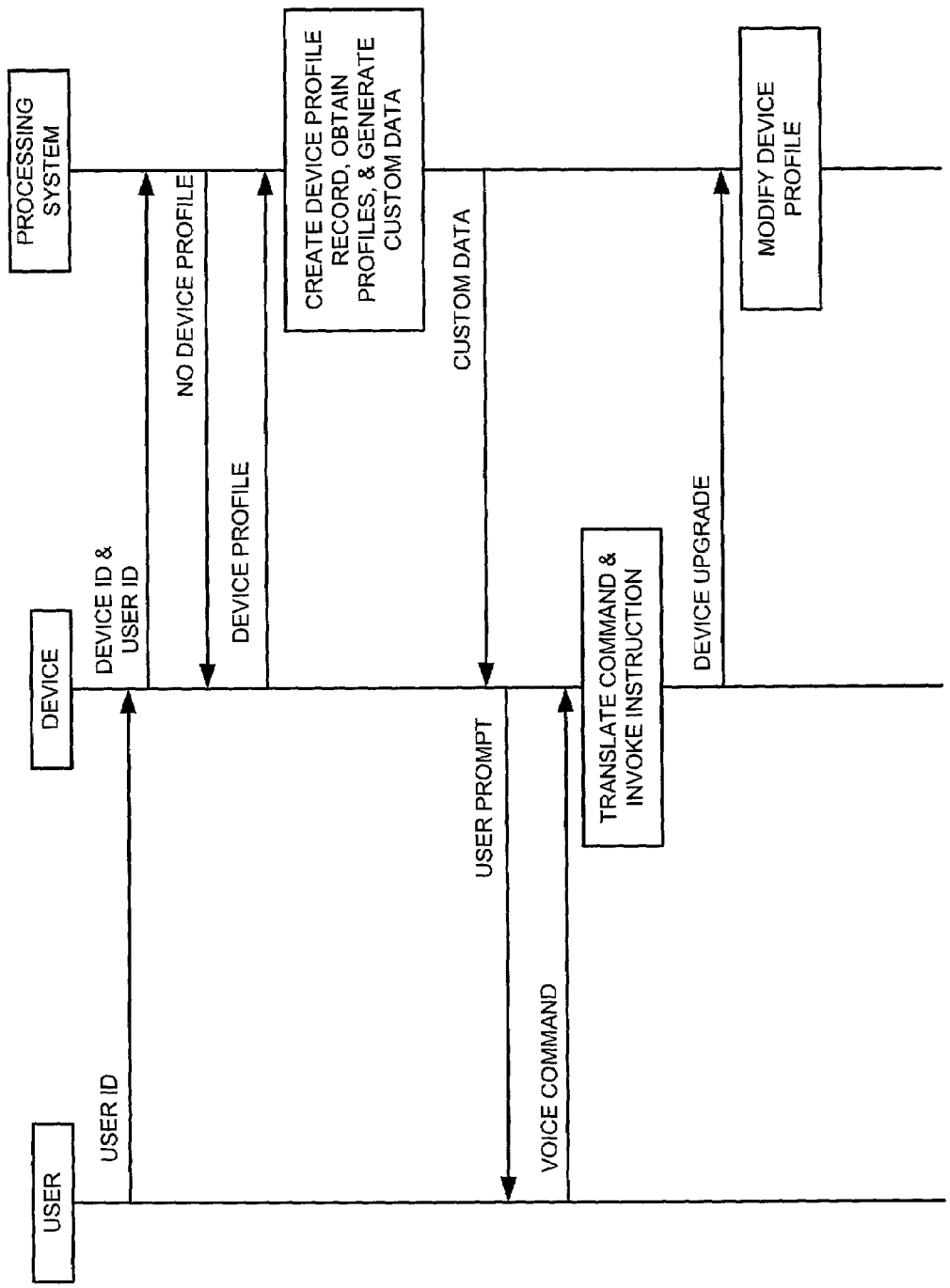
FIG. 5 illustrates voice recognition system operation in an example of the invention.

On FIG. 5, a device receives a signal indicating a user ID. The device transfers a signal to the processing system indicating its device ID and the user ID. The processing system determines that there is no device profile for the device ID and transfers a signal indicating this to the device. As indicated above, the device profile associates identifiers or names for spoken commands received by the device with instruction sequences responsively invoked by the device. The device may indicate the need for a device profile to the user and may assist in device profile creation. The processing system may transfer an application to the device to assist in device profile creation. The device generates its device profile and transfers a signal to the processing system indicating the device profile. The profile must be created and stored on the processing system from the device data message. The processing system then generates a set of voice recognition data customized for the device and the user based on the device voice recognition profile for the device and the user voice recognition profile for the user. The custom data could include voice patterns from the user profile that match identifiers or names for spoken commands from the device profile. The custom data could also include identifiers or names for spoken commands and voice patterns from the user profile that can be associated with instruction sequences in the device profile. For example, the spoken command and voice profile for the term "go" from the user profile could be substituted for the term "start" in the device profile and associated with the instruction sequence associated with the start command. The processing system transfers a signal to the device indicating its custom set of the voice recognition data, and when done loading, the device indicates that it is ready to receive voice commands. The device receives a voice command from the user and translates the voice command based on this custom set of the voice recognition data. The device then invokes the instruction sequence that corresponds to the translated command in the device profile.

During subsequent operation, the device may be upgraded with a modified or new device profile. The device transfers this new data to the processing system. The processing system modifies the device profile based on the new data.

The creation of user and device profiles may be an iterative process. Some devices may require an entirely trained command set before operation while other devices may operate with a partially trained command set. Thus, the user and device profiles may build over time as existing devices are used more extensively and new devices are introduced. The users, devices, and processing system interact to continually add to and modify the user and device profiles.

FIGS. 1–5 and the above description depict specific examples of a voice recognition system in accord with the present invention. Those skilled in the art will appreciate that some conventional aspects of the voice recognition system have been simplified or omitted for clarity. Those skilled in the art will appreciate that the features described above could be combined in various ways to form multiple variations of the invention. Those skilled in the art will also appreciate variations of the voice recognition system that fall within the scope of the invention. As a result, the invention is not limited to the specific examples described above, but only by the following claims and their equivalents.

The invention claimed is:

1. A method of operating a voice recognition system, the method comprising:

receiving a first signal indicating a first user ID for a first user into a first device;

transferring a second signal indicating a first device ID for the first device and indicating the first user ID to a processing system;

in the processing system, obtaining a first device voice recognition profile based on the first device ID and obtaining a first user voice recognition profile based on the first user ID;

in the processing system, generating a first set of voice recognition data customized for the first device and the first user based on the first device voice recognition profile and the first user voice recognition profile;

transferring a third signal indicating the first set of the voice recognition data from the processing system to the first device;

in the first device, indicating voice command readiness in response to the first set of the voice recognition data;

receiving a first voice command from the first user into the first device; and in the first device, translating the first voice command based on the first set of the voice recognition data.

2. The method of claim 1 further comprising:
receiving a fourth signal indicating the first user ID into a second device;
transferring a fifth signal indicating a second device ID for the second device and indicating the first user ID to the processing system;
in the processing system, obtaining a second device voice recognition profile based on the second device ID and obtaining the first user voice recognition profile based on the first user ID, wherein the second device voice recognition profile is different from the first device voice recognition profile to reflect different voice recognition capabilities between the first device and the second device;
in the processing system, generating a second set of the voice recognition data customized for the second device and the first user based on the second device voice recognition profile and the first user voice recognition profile;
transferring a sixth signal indicating the second set of the voice recognition data from the processing system to the second device;
in the second device, indicating voice command readiness in response to the second set of the voice recognition data;
receiving a second voice command from the first user into the second device; and
in the second device, translating the second voice command based on the second set of the voice recognition data.

3. The method of claim 1 further comprising:
receiving a fourth signal indicating a second user ID for a second user into the first device;
transferring a fifth signal indicating the first device ID and indicating the second user ID to a processing system;
in the processing system, obtaining the first device voice recognition profile based on the first device ID and obtaining a second user voice recognition profile based on the second user ID, wherein the second user voice recognition profile is different from the first user voice recognition profile to reflect different voice recognition characteristics between the first user and the second user;
in the processing system, generating a second set of the voice recognition data customized for the first device and the second user based on the first device voice recognition profile and the second user voice recognition profile;
transferring a sixth signal indicating the second set of the voice recognition data from the processing system to the first device;
in the first device, indicating voice command readiness in response to the second set of the voice recognition data;
receiving a second voice command from the second user into the first device; and
in the first device, translating the second voice command based on the second set of the voice recognition data.

4. The method of claim 1 further comprising
receiving a fourth signal indicating a second user ID for a second user into a second device;
transferring a fifth signal indicating a second device ID for the second device and indicating the second user ID to the processing system;
in the processing system, obtaining a second device voice recognition profile based on the second device ID and obtaining a second user voice recognition profile based on the second user ID, wherein the second device voice recognition profile is different from the first device voice recognition profile to reflect different voice recognition capabilities between the first device and the second device, and wherein the second user voice recognition profile is different from the first user voice recognition profile to reflect different voice recognition characteristics between the first user and the second user;
in the processing system, generating a second set of the voice recognition data customized for the second device and the second user based on the second device voice recognition profile and the second user voice recognition profile;
transferring a sixth signal indicating the second set of the voice recognition data from the processing system to the second device;
in the second device, indicating voice command readiness in response to the second set of the voice recognition data;
receiving a second voice command from the second user into the second device; and
in the second device, translating the second voice command based on the second set of the voice recognition data.

5. The method of claim 1 further comprising:
transferring a fourth signal indicating new voice recognition data for the first user from the first device to the processing system; and
in the processing system, modifying the first user voice recognition profile based on the new voice recognition data for the first user.

6. The method of claim 1 further comprising:
transferring a fourth signal indicating new voice recognition data for the first device from the first device to the processing system; and
in the processing system, modifying the first device voice recognition profile based on the new voice recognition data for the first device.

7. The method of claim 1 wherein the second signal further indicates the first user voice recognition profile.

8. The method of claim 1 wherein the second signal further indicates the first device voice recognition profile.

9. The method of claim 1 wherein generating the first set of the voice recognition data customized for the first device and the first user based on the first device voice recognition profile and the first user voice recognition profile comprises translating a command recognition library for the first user into a format suitable for the first device.

10. The method of claim 1 wherein translating the first voice command based on the first set of the voice recognition data comprises converting audible user speech into an electronic signal indicating the first voice command.

11. A voice recognition system comprising:
a first device configured to receive a first signal indicating a first user ID for a first user, transfer a second signal indicating a first device ID for the first device and indicating the first user ID, receive a third signal indicating a first set of voice recognition data, indicate voice command readiness in response to the first set of the voice recognition data, receive a first voice command from the first user, and translate the first voice command based on the first set of the voice recognition data; and
a processing system configured to receive the second signal, obtain a first device voice recognition profile based on the first device ID, obtain a first user voice recognition profile based on the first user ID, generate the first set of the voice recognition data customized for the first device and the first user based on the first device voice recognition profile and the first user voice recognition profile, and transfer the third signal.

12. The voice recognition system of claim 11 further comprising:
a second device configured to receive a fourth signal indicating the first user ID, transfer a fifth signal indicating a second device ID for the second device and indicating the first user ID, receive a sixth signal indicating a second set of the voice recognition data, indicate voice command readiness in response to the second set of the voice recognition data, receive a second voice command from the first user, and translate the second voice command based on the second set of the voice recognition data; and wherein
the processing system is further configured to receive the fifth signal, obtain a second device voice recognition profile based on the second device ID wherein the second device voice recognition profile is different from the first device voice recognition profile to reflect different voice recognition capabilities between the first device and the second device, obtain the first user voice recognition profile based on the first user ID, generate the second set of the voice recognition data customized for the second device and the first user based on the second device voice recognition profile and the first user voice recognition profile, and transfer the sixth signal.

13. The voice recognition system of claim 11 wherein:
the first device is further configured to receive a fourth signal indicating a second user ID for a second user, transfer a fifth signal indicating the first device ID and indicating the second user ID, receive a sixth signal indicating a second set of the voice recognition data, indicate voice command readiness in response to the second set of the voice recognition data, receive a second voice command from the second user, and translate the second voice command based on the second set of the voice recognition data; and
the processing system is further configured to receive the fifth signal, obtain the first device voice recognition profile based on the first device ID, obtain a second user voice recognition profile based on the second user ID wherein the second user voice recognition profile is different from the first user voice recognition profile to reflect different voice recognition characteristics between the first user and the second user, generate the second set of the voice recognition data customized for the first device and the second user based on the first device voice recognition profile and the second user voice recognition profile, and transfer the sixth signal.

14. The voice recognition system of claim 11 further comprising:
a second device configured to receive a fourth signal indicating a second user ID for a second user, transfer a fifth signal indicating a second device ID for the second device and indicating the second user ID, receive a sixth signal indicating a second set of the voice recognition data, indicate voice command readiness in response to the second set of the voice recognition data, receive a second voice command from the second user, and translate the second voice command based on the second set of the voice recognition data; and wherein the processing system is further configured to receive the fifth signal, obtain a second device voice recognition profile based on the second device ID wherein the second device voice recognition profile is different from the first device voice recognition profile to reflect different voice recognition capabilities between the first device and the second device, obtain a second user voice recognition profile based on the second user ID wherein the second user voice recognition profile is different from the first user voice recognition profile to reflect different voice recognition characteristics between the first user and the second user, generate the second set of the voice recognition data customized for the second device and the second user based on the second device voice recognition profile and the second user voice recognition profile, and transfer the sixth signal.

15. The voice recognition system of claim 11 wherein:
the first device is further configured to transfer a fourth signal indicating new voice recognition data for the first user; and
the processing system is further configured to modify the first user voice recognition profile based on the new voice recognition data for the first user.

16. The voice recognition system of claim 11 wherein:
the first device is further configured to transfer a fourth signal indicating new voice recognition data for the first device; and
the processing system is further configured to modify the first device voice recognition profile based on the new voice recognition data for the first device.

17. The voice recognition system of claim 11 wherein the second signal further indicates the first user voice recognition profile.

18. The voice recognition system of claim 11 wherein the second signal further indicates the first device voice recognition profile.

19. The voice recognition system of claim 11 wherein the processing system is configured to translate a command recognition library for the first user into a format suitable for the first device.

20. The voice recognition system of claim 11 wherein the first device is configured to convert audible user speech into an electronic signal indicating the first voice command based on the first set of the voice recognition data.

21. A method of operating a processing system for a voice recognition system, the method comprising:
receiving a first signal from a first device indicating a first user ID for a first user and a first device ID for the first device;
obtaining a first device voice recognition profile based on the first device ID and obtaining a first user voice recognition profile based on the first user ID;
generating a first set of voice recognition data customized for the first device and the first user based on the first device voice recognition profile and the first user voice recognition profile; and
transferring a second signal to the first device indicating the first set of the voice recognition data.

22. The method of claim 21 further comprising:
receiving a third signal from a second device indicating the first user ID and a second device ID for the second device;
obtaining a second device voice recognition profile based on the second device ID wherein the second device voice recognition profile is different from the first device voice recognition profile to reflect different voice recognition capabilities between the first device and the second device and obtaining the first user voice recognition profile based on the first user ID;

generating a second set of the voice recognition data customized for the second device and the first user based on the second device voice recognition profile and the first user voice recognition profile; and transferring a fourth signal to the second device indicating the second set of the voice recognition data.

23. The method of claim 21 further comprising receiving a third signal from the first device indicating a second user ID for a second user and the first device ID;

obtaining the first device voice recognition profile based on the first device ID and obtaining a second user voice recognition profile based on the second user ID wherein the second user voice recognition profile is different from the first user voice recognition profile to reflect different voice recognition characteristics between the first user and the second user;

generating a second set of the voice recognition data customized for the first device and the second user based on the first device voice recognition profile and the second user voice recognition profile; and transferring a fourth signal to the first device indicating the second set of the voice recognition data.

24. The method of claim 21 further comprising receiving a third signal from a second device indicating a second user ID for a second user and a second device ID for the second device;

obtaining a second device voice recognition profile based on the second device ID and obtaining a second user voice recognition profile based on the second user ID, wherein the second device voice recognition profile is different from the first device voice recognition profile to reflect different voice recognition capabilities between the first device and the second device, and wherein the second user voice recognition profile is different from the first user voice recognition profile to reflect different voice recognition characteristics between the first user and the second user;

generating a second set of the voice recognition data customized for the second device and the second user based on the second device voice recognition profile and the second user voice recognition profile; and transferring a fourth signal to the second device indicating the second set of the voice recognition data.

25. The method of claim 21 further comprising:

receiving a third signal indicating new voice recognition data for the first user from the first device; and modifying the first user voice recognition profile based on the new voice recognition data for the first user.

26. The method of claim 21 further comprising:

receiving a fourth signal indicating new voice recognition data for the first device from the first device; and modifying the first device voice recognition profile based on the new voice recognition data for the first device.

27. The method of claim 21 wherein the first signal further indicates the first user voice recognition profile.

28. The method of claim 21 wherein the first signal further indicates the first device voice recognition profile.

29. The method of claim 21 wherein generating the first set of the voice recognition data customized for the first device and the first user based on the first device voice recognition profile and the first user voice recognition profile comprises translating a command recognition library for the first user into a format suitable for the first device.

30. The method of claim 21 wherein the first set of the voice recognition data is configured to allow the first device to convert audible user speech into an electronic signal indicating a voice command.

31. A processing system for a voice recognition system, the processing system comprising:

a communication interface configured to receive a first signal from a first device indicating a first user ID for a first user and a first device ID for the first device and transfer a second signal to the first device indicating a first set of voice recognition data; and a control system coupled to the communication interface and configured to obtain a first device voice recognition profile based on the first device ID, obtain a first user voice recognition profile based on the first user ID, and generate the first set of the voice recognition data customized for the first device and the first user based on the first device voice recognition profile and the first user voice recognition profile.

32. The processing system of claim 31 wherein:

the communication interface is further configured to receive a third signal from a second device indicating the first user ID and a second device ID for the second device and transfer a fourth signal to the second device indicating a second set of the voice recognition data; and the control system is further configured to obtain a second device voice recognition profile based on the second device ID wherein the second device voice recognition profile is different from the first device voice recognition profile to reflect different voice recognition capabilities between the first device and the second device, obtain the first user voice recognition profile based on the first user ID, and generate the second set of the voice recognition data customized for the second device and the first user based on the second device voice recognition profile and the first user voice recognition profile.

33. The processing system of claim 31 wherein:

the communication interface is further configured to receive a third signal from the first device indicating a second user ID for a second user and the first device ID and transfer a fourth signal to the first device indicating a second set of the voice recognition data; and the control system is further configured to obtain the first device voice recognition profile based on the first device ID, obtain a second user voice recognition profile based on the second user ID wherein the second user voice recognition profile is different from the first user voice recognition profile to reflect different voice recognition characteristics between the first user and the second user, and generate the second set of the voice recognition data customized for the first device and the second user based on the first device voice recognition profile and the second user voice recognition profile.

34. The processing system of claim 31 wherein:

the communication interface is further configured to receive a third signal from a second device indicating a second user ID for a second user and a second device ID for the second device and transfer a fourth signal to the second device indicating a second set of the voice recognition data; and the control system is further configured to obtain a second device voice recognition profile based on the second device ID wherein the second device voice recognition profile is different from the first device voice recognition profile to reflect different voice recognition capabilities between the first device and the second device, obtain a second user voice recognition profile based on the second user ID wherein the second user voice recognition profile is different from the first user voice recognition profile to reflect different voice recognition characteristics between the first user and the second user, and generate the second set of the voice recognition data customized for the second device and the second user based on the second device voice recognition profile and the second user voice recognition profile.

35. The processing system of claim 31 wherein:
the communication interface is further configured to receive a third signal from the first device indicating new voice recognition data for the first user; and
the control system is further configured to modify the first user voice recognition profile based on the new voice recognition data for the first user.

36. The processing system of claim 31 wherein:
the communication interface is further configured to receive a third signal from the first device indicating new voice recognition data for the first device; and
the control system is further configured to modify the first device voice recognition profile based on the new voice recognition data for the first device.

37. The processing system of claim 31 wherein the first signal further indicates the first user voice recognition profile.

38. The processing system of claim 31 wherein the first signal further indicates the first device voice recognition profile.

39. The processing system of claim 31 wherein the control system is configured to translate a command recognition library for the first user into a format suitable for the first device.

40. The processing system of clam 31 wherein the first set of the voice recognition data is configured to allow the first device to convert audible user speech into an electronic signal indicating a voice command.

41. A software product for a voice recognition system, the software product comprising:
software configured to direct a control system to receive a first user ID for a first user and a first device ID for a first device from a communication interface, obtain a first device voice recognition profile based on the first device ID, obtain a first user voice recognition profile based on the first user ID, generate a first set of voice recognition data customized for the first device and the first user based on the first device voice recognition profile and the first user voice recognition profile, and transfer the first set of the voice recognition data to the communication interface for transfer to the first device; and
a storage medium operational to store the software.

42. The software product of claim 41 wherein the software is further configured to direct the control system to receive the first user ID and a second device ID for a second device from the communication interface, obtain a second device voice recognition profile based on the second device ID wherein the second device voice recognition profile is different from the first device voice recognition profile to reflect different voice recognition capabilities between the first device and the second device, obtain a first user voice recognition profile based on the first user ID, generate a second set of the voice recognition data customized for the second device and the first user based on the second device voice recognition profile and the first user voice recognition profile, and transfer the second set of the voice recognition data to the communication interface for transfer to the second device.

43. The software product of claim 41 wherein the software is further configured to direct the control system to receive a second user ID for a second user and the first device ID from the communication interface, obtain the first device voice recognition profile based on the first device ID, obtain a second user voice recognition profile based on the second user ID wherein the second user voice recognition profile is different from the first user voice recognition profile to reflect different voice recognition characteristics between the first user and the second user, generate a second set of the voice recognition data customized for the first device and the second user based on the first device voice recognition profile and the second user voice recognition profile, and transfer the second set of the voice recognition data to the communication interface for transfer to the first device.

44. The software product of claim 41 wherein the software is further configured to direct the control system to receive a second user ID for a second user and a second device ID for a second device from the communication interface, obtain a second device voice recognition profile based on the second device ID wherein the second device voice recognition profile is different from the first device voice recognition profile to reflect different voice recognition capabilities between the first device and the second device, obtain a second user voice recognition profile based on the second user ID wherein the second user voice recognition profile is different from the first user voice recognition profile to reflect different voice recognition characteristics between the first user and the second user, generate a second set of the voice recognition data customized for the second device and the second user based on the second device voice recognition profile and the second user voice recognition profile, and transfer the second set of the voice recognition data to the communication interface for transfer to the second device.

45. The software product of claim 41 wherein the software is further configured to direct the control system to receive new voice recognition data for the first user from the communication interface and modify the first user voice recognition profile based on the new voice recognition data for the first user.

46. The software product of claim 41 wherein the software is further configured to direct the control system to receive new voice recognition data for the first device from the communication interface and modify the first device voice recognition profile based on the new voice recognition data for the first device.

47. The software product of claim 41 wherein the software is further configured to direct the control system to receive the first user voice recognition profile from the communication interface.

48. The software product of claim 41 wherein the software is further configured to direct the control system to receive the first device voice recognition profile from the communication interface.

49. The software product of claim 41 wherein the software is configured to direct the control system to translate a command recognition library for the first user into a format suitable for the first device.

50. The software product of claim 41 wherein the first set of the voice recognition data is configured to allow the first device to convert audible user speech into an electronic signal indicating a voice command.

* * * * *